United States Patent [19]
Sherer et al.

[11] Patent Number: 5,875,175
[45] Date of Patent: Feb. 23, 1999

[54] METHOD AND APPARATUS FOR TIME-BASED DOWNLOAD CONTROL

[75] Inventors: William Paul Sherer, Sunnyvale; David R. Brown, San Jose; Richard Reid, Mountain View; Glenn Connery, Sunnyvale; Chi-Lie Wang, San Jose, all of Calif.

[73] Assignee: 3Com Corporation, Santa Clara, Calif.

[21] Appl. No.: 846,900

[22] Filed: May 1, 1997

Related U.S. Application Data

[60] Provisional application No. 60/032,124 Dec. 5, 1996.
[51] Int. Cl.$^6$ ................................................ H04L 12/56
[52] U.S. Cl. ...................... 370/230; 370/394; 370/412; 395/200.62
[58] Field of Search ............................ 370/229–238, 370/392, 393, 394, 412, 415, 416, 428, 429; 395/200.62–200.64

[56] References Cited

U.S. PATENT DOCUMENTS

| | | | |
|---|---|---|---|
| 5,020,055 | 5/1991 | May, Jr. | 370/474 |
| 5,166,930 | 11/1992 | Braff et al. | 370/426 |
| 5,379,297 | 1/1995 | Glover et al. | 370/474 |

OTHER PUBLICATIONS

C.R. Kalmanek et al., "Rate Controlled Servers for Very High–Speed Networks", Globecom'90: IEEE Global Telecommunications Conference and Exhibition. 'Communications: Connecting the Future' (Cat. No. 90CH2827–4) vol. 1, pp. 12–20, Dec. 1990.

K.K. Ramaakrishnan, "Scheduling Issues for Interfacing to High Speed Networks", Globecom'92. Communication for Global Users. IEEE Global Telecommunications Conference (Cat. No. 92CH3130–2), vol. 1, pp. 622–666, Dec. 1992.

A. Hung et al., "Bandwidth Scheduling for Wide–Area ATM Networks Using Virtual Finishing Times", IEEE/ACM Transactions on Networking, vol. 4, Iss. 1, pp. 49–54, Feb. 1996.

*Primary Examiner*—Melvin Marcelo
*Attorney, Agent, or Firm*—Townsend and Towsend and Crew LLP

[57] ABSTRACT

A network transmitter schedules packets so that packets are transmitted to a host or group of hosts so as not to overload any particular part of the network. In an embodiment, the transmitter uses packet data structures with a schedule indication for packets placed in the queue so that an independently running adaptor may know when to remove packets from the queue and transmit them. In an alternative embodiment, packets are scheduled by setting a future interrupt for transmitting a packet or group of packets. In a further embodiment, packets are placed in temporal sets where a temporal set is a group of packets that can be transmitted in succession without violating the bandwidth limitations of any network segment.

14 Claims, 8 Drawing Sheets

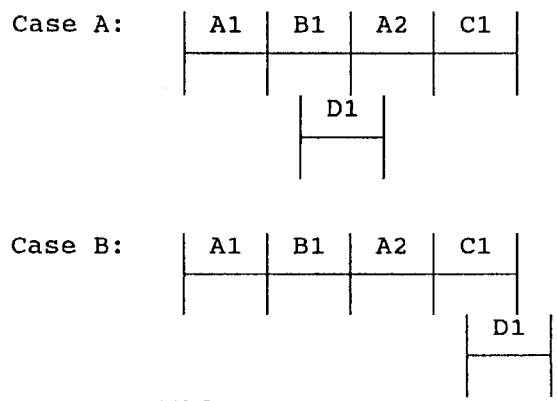
FIG. 4B
| nth DnFragLen | (n X 8) + 4 |
| --- | --- |
| nth DnFragAddr | n X 8 |
| 1st DnFragLen | 14 |
| 1st DnFragAddr | 10 |
| (reserved) | c |
| FrameStartHeader | 8 |
| ScheduleTime | 4 |
| DnNextPtr | 0 |
FIG. 5
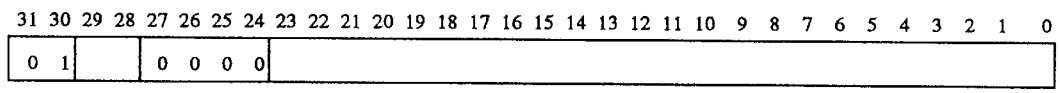
FIG. 6
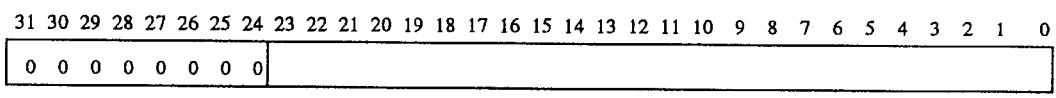
FIG. 10
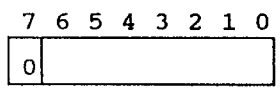
FIG. 11

METHOD AND APPARATUS FOR TIME-BASED DOWNLOAD CONTROL

BACKGROUND OF THE INVENTION

This application claims priority from provisional patent application Ser. No. 60/032,124, filed Dec. 5, 1996, which discussed a number of background concepts related to the invention.

The current invention relates to the field of electronic circuits. More particularly, the current invention relates to improvements in networked computer environments and has particular applications to the transmission of information between digital devices over a communications medium. A wide variety of types of computer systems and networks exists, each having variations in particular implementations. The present invention will be described with reference to particular types of systems for clarity, but this should not be taken to limit the invention. It will be apparent to those of skill in the art that the invention has applications in many different types of computer and network systems. The invention therefore should not be seen as limited except as specifically provided in the attached claims.

Digital computer networks have become ubiquitous in academic, industry, and office environments. A number of different aspects of computer networks are discussed in coassigned pending U.S. applications Ser. Nos. 08/313,674 U.S. Pat. No. 5,568,469; 08/542,157 U.S. Pat. No. 5,818,838; 08/506,533 U.S. Pat. No. 5,666,362; and 08/329,714 U.S. Pat. No. 5,568,476 each of which are incorporated herein by reference to the extent necessary to understand the invention.

This specification presumes familiarity with the general concepts, protocols, and devices currently used in LAN networking and WAN internetworking applications such as, for example, the IEEE 802 and ISO 8802 protocol suites and other series of documents released by the Internet Engineering Task Force. Many examples of such protocols are publicly available and are discussed in more detail in the above-referenced patent applications and therefore will not be fully discussed here.

FIG. 1

FIG. 1 illustrates a local area network (LAN) 40 of a type that might be used today in a moderate-sized office or academic environment as an example of a type of network in which the present invention may be employed. LANs are arrangements of various hardware and software elements that operate together to allow a number of digital devices to exchange data within the LAN and also may include internet connections to external wide area networks (WANs) such as WANs 82 and 84. Typical modern LANs such as 40 are comprised of one to many LAN intermediate systems (ISs) such as ISs 60–62 and 67 that are responsible for data transmission throughout the LAN and a number of end systems (ESs) such as ESs 50*a–d*, 51*a–c*, and 52*a–g*, that represent the end user equipment. The ESs may be familiar end-user data processing equipment such as personal computers, workstations, and printers and additionally may be digital devices such as digital telephones or real-time video displays. Different types of ESs can operate together on the same LAN. In one type of LAN, LAN ISs 60–61 are referred to as bridges and WAN ISs 64 and 66 are referred to as routers, and IS 67 is referred to as a repeater, however many different LAN configurations are possible, and the invention is not limited in application to the network shown in FIG. 1.

The LAN shown in FIG. 1 has segments 70*a–e*, 71*a–e*, and 72*a–e*, and 73*a*. A segment is generally a single interconnected medium, such as a length of contiguous wire, optical fiber, or coaxial cable or a particular frequency band. A segment may connect just two devices, such as segment 70*a*, or a segment such as 72*d* may connect a number of devices using a carrier sense multiple access/collision detect (CSMA/CD) protocol or other multiple access protocol such as a token bus or token ring. A signal transmitted on a single segment, such as 72*d*, is generally simultaneously heard by all of the ESs and ISs connected to that segment.

Drivers and Adaptors

The ISs and ESs in FIG. 1 generally each includes one or more adaptors and a set of drivers. An adaptor generally includes circuitry and connectors for communication over a segment and translates data from the digital form used by the computer circuitry in the IS or ES into a form that may be transmitted over the segment, e.g., electrical signals, optical signals, radio waves, etc. An ES such as 50*b* will generally have one adaptor for connecting to its single segment. A LAN IS such as 61 will have five adaptors, one for each segment to which it is connected.

A driver is a set of instructions resident on a device that allows the device to accomplish various tasks as defined by different network protocols. Drivers are generally software programs stored on the ISs or ESs in a manner that allows the drivers to be modified without necessarily modifying the IS or ES hardware.

Adaptor to Host Interface

Another aspect of networks is the interface between the network, the adaptor, and the host operating system. Some types of network protocols may require a large amount of attention from a host processor. This can be undesirable where a host's activity on the network impinges on the host processor's ability to perform other host functions. Adaptors may also differ in their ability to buffer network traffic. Some adaptors rely on the host to buffer most network traffic and do not include a large amount of buffer memory on the adaptor itself.

Need For Improved Transmission Scheduling

In recent years, the amount and type of data that users wish to transmit over a network has increased dramatically. This increase is not only in the total amount of data transmitted, but also in the number of different types of data streams that might be carried on the same network. Increasingly, users desire a LAN such as that shown in FIG. 1, to carry digital data, such as electronic messages or program and data files, real-time audio signals, and real-time video signals, all over the same network. These different data streams may have widely different requirements in terms of total bandwidth and sensitivity to latency and jitter.

What is needed is an improved network component that can effectively operate on a network carrying different types of data traffic with different operating speeds and prevent slower components in a network from degrading the transmission performance of other components.

SUMMARY OF THE INVENTION

The present invention comprises techniques and devices for improved computer network adaptors and drivers that schedule packets to be transmitted so as to optimize network performance. In some types of prior art adaptors, packets of data are assembled by the host processor and placed in a queue in a shared system memory. Once these packets are complete, the adaptor generally will, when it is ready, begin to download queued packets from shared system memory and transmit them over the network when its network connection is available. In many prior art adaptors, packets are downloaded by the adaptor and transmitted over the network in first-in/first-out (FIFO) order, with the first packet placed in system memory by the host processor being the first transmitted by the adaptor. While the invention has advantages in adaptors that transmit packets in FIFO order, it may also be used in adaptors that order packets based on destinations in order to spread packets, such as described in coassigned patent application Ser. No. 08/850,906.

In general, in prior art networks of the kind described herein, particularly in ethernet-type networks, a transmitting host and transmitting adaptor are unaware of the speed at which the destination host or the network connecting the source to the destination can receive packets. Packets are transmitted by the adaptor as soon as the network is available. While prior adaptors may observe rules regarding prioritizing packets and may defer transmission of lower priority packets for higher priority packets, the adaptor does not control the rate at which it transmits packets based on the rate that the network or receiver can receive them.

In the present invention, the host processor, or, more precisely, a scheduling process running on the host processor or possibly and alternatively on an adaptor processor, attempts to schedule transmitted packets so as not to transmit packets faster than a receiver can receive them or, in another embodiment, faster than the network (i.e. intermediate systems) can deliver the packets.

According to the invention, a scheduler is provided with information regarding bandwidth capabilities of network destinations or of intermediate paths in the network through which the packets will flow. This information may be provided in a variety of ways, including but not limited to: a protocol of end-system bandwidth notification as described in coassigned, copending application Ser. No. 08/903,766, wherein end-systems may communicate with each other and the network information regarding their bandwidth capabilities; entry of network topology and bandwidth information by a network administrator; a mechanism for timing the round-trip or one-way delay of a packet delivered to a destination, or any other means. The particular mechanism by which the bandwidth capabilities of the destination or network is known to the transmitter is not a part of the present invention.

The scheduler, knowing the bandwidth of a particular destination, determines a schedule for transmitting packets so that a destination does not receive packets faster than it can handle those packets. The scheduler may do this according to a variety of algorithms. These various scheduler algorithms may take into account a number of different network characteristics, including but not limited to the buffer capacity of various intermediate systems (which may be thought of as network elasticity), alert response latency of a particular adaptor or operating system, minimum jitter requirements, or any other inherent or desired characteristic of network transmitter performance.

The scheduler controls transmission of packets by providing for packet transmission alerts to the adaptor to transmit the packets. Two specific alternative mechanisms for generating alerts are described in detail below (interrupt-based download control and descriptor-based download control), but other mechanism for generating alerts are possible within the invention.

In interrupt-based download control, the scheduler sets (or programs) a future interrupt for a to-be-transmitted packet based on the schedule for that destination. When the interrupt occurs, the driver instructs the adaptor to transmit the scheduled packet.

In descriptor-based download control, the scheduler attaches a scheduling indication to packets placed in system memory, and the adaptor uses that indication to determine when to download that packet from system memory and transmit the packet on the network.

According to the invention, other techniques, including grouping packets into temporal sets, may be used by the scheduler to control the flow of transmitted packets to optimize network performance. Temporal sets are groups of packets that the scheduler determines can be transmitted in back-to-back fashion without violating the target bandwidth of any destination. When packets are grouped into temporal sets, the scheduler may set just one alert for a group of packets.

Specific aspects of the invention will be better understood upon reference to the following description of specific embodiments and the attached claims.

BRIEF DESCRIPTION OF THE DRAWINGS

FIGS. 4A and 4B illustrate adding a packet to a temporal set according to an embodiment of the invention.

FIG. 5 illustrates one example of a packet data structure (stored in system memory) according to an embodiment of the invention.

FIG. 6 illustrates the format of a ScheduleTime value according to the invention.

FIG. 10 shows the real time count register according to one embodiment of the invention.

FIG. 11 illustrates the dnPollCnt register according to an embodiment of the invention.

DETAILED DESCRIPTION OF SPECIFIC EMBODIMENTS

The invention consists of a number of functional units which work together to effect methods of the invention. It will be apparent to those of skill in the art and from the description below that some of these functional units can be employed independently to accomplish aspects of the invention. It will also be apparent that various alternative components described below can be combined to construct a system according to the invention.

Packet Scheduling to Control Transmitter Bandwidth

Figure 1:
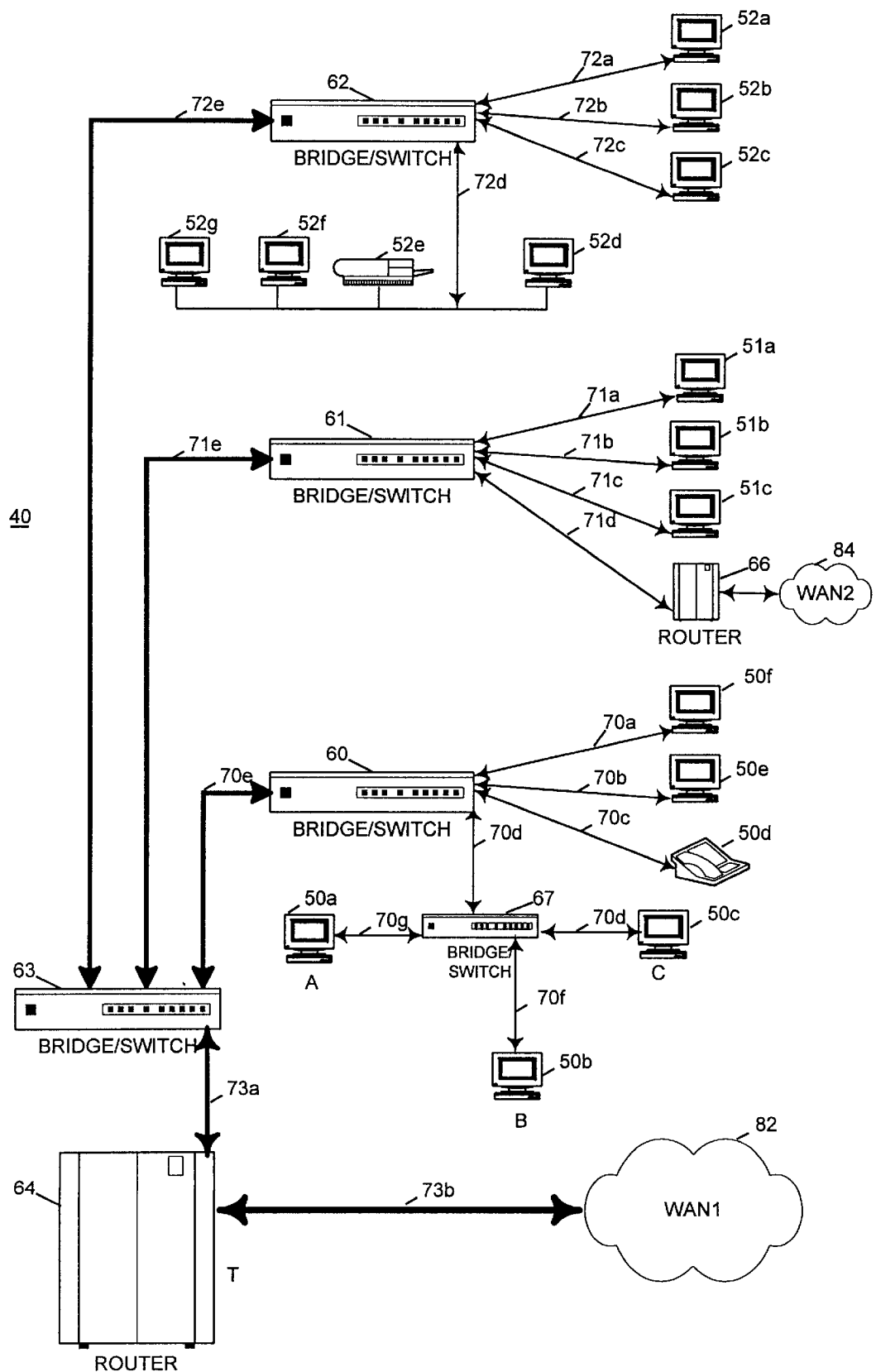
FIG. 1 is a diagram of a moderate sized network of one type in which the invention may be effectively employed.
Figure 2A:
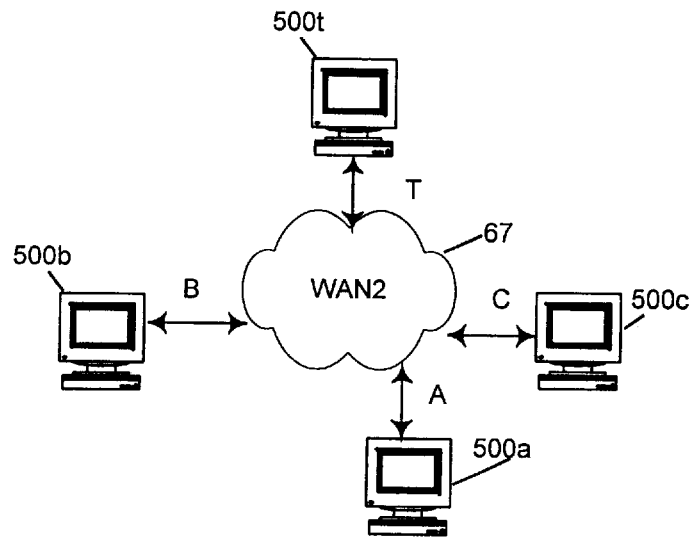
FIG. 2A is a diagram illustrating a simplified network consisting of a transmitter transmitting to three receivers to illustrate aspects of the invention.
Figure 2B:
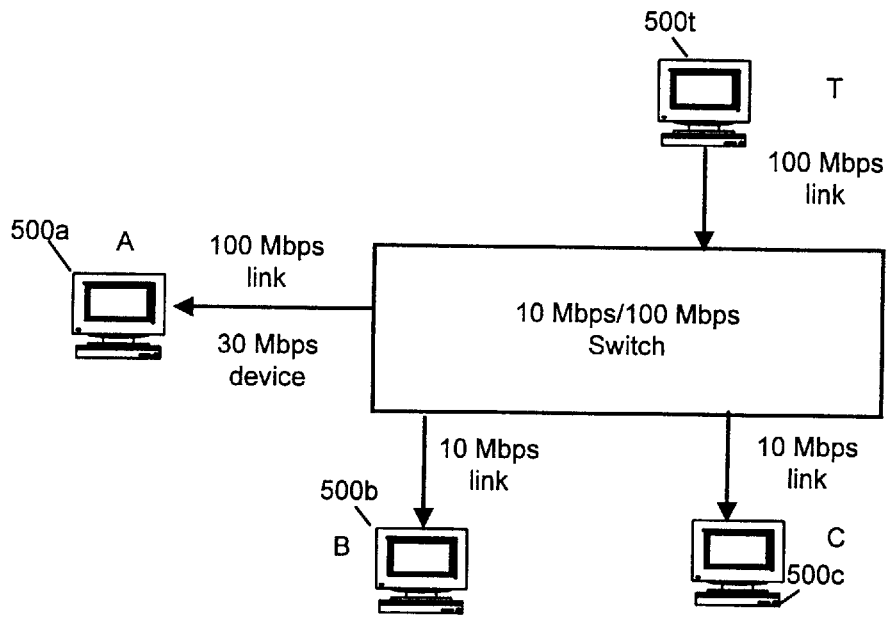
FIG. 2B is an alternative diagram illustrating the network of FIG. 2A using one particular type of switching device to implement the network.

FIGS. 2A and 2B are alternative simplified diagrams of a network showing a transmitter T connected to three receivers A, B, and C as an example of a network connection in order to illustrate aspects of the invention.

Figure 3A:
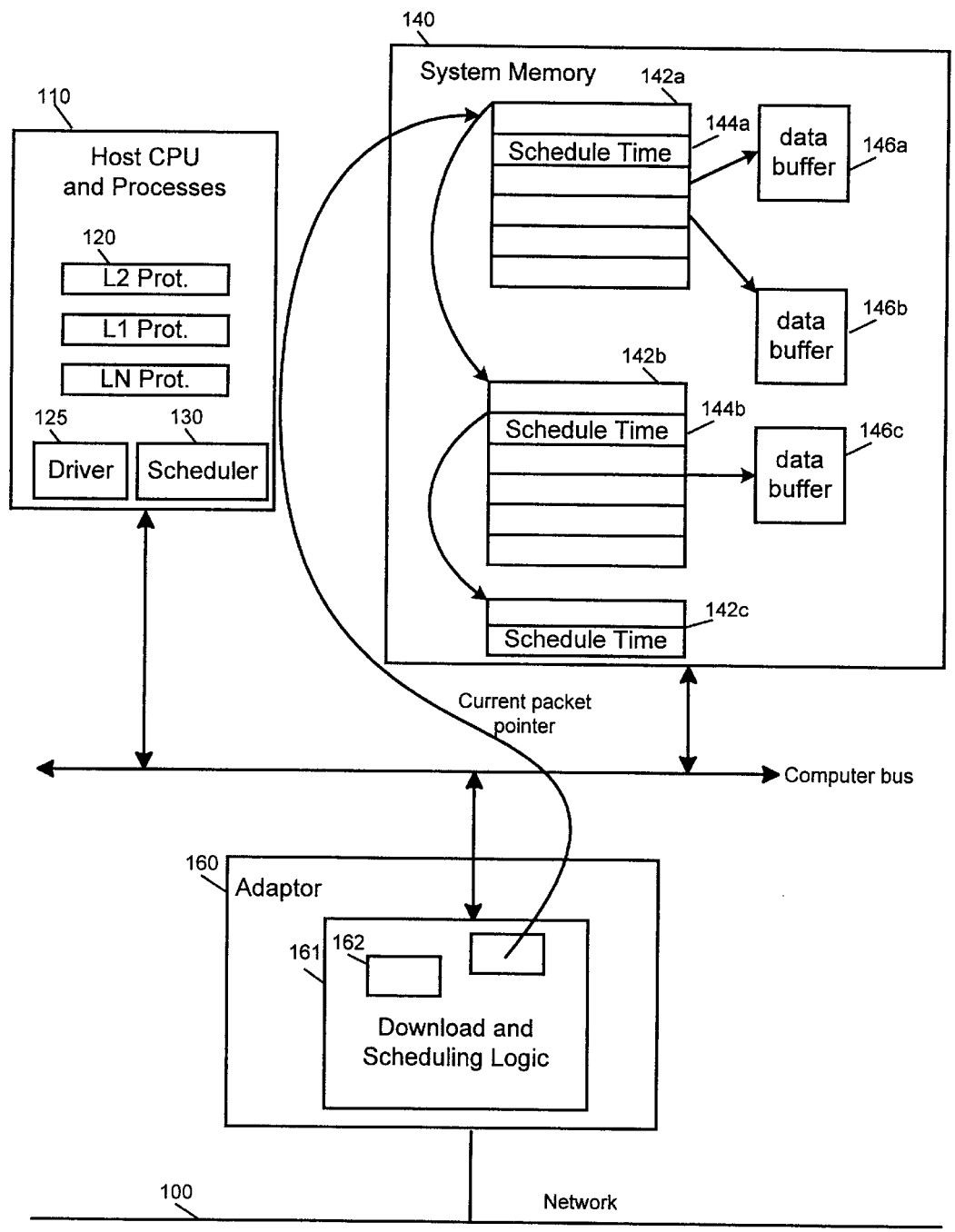
FIG. 3A is a block diagram of an end system having system memory and an adaptor using descriptor based download control according to one embodiment of the invention.
Figure 3B:
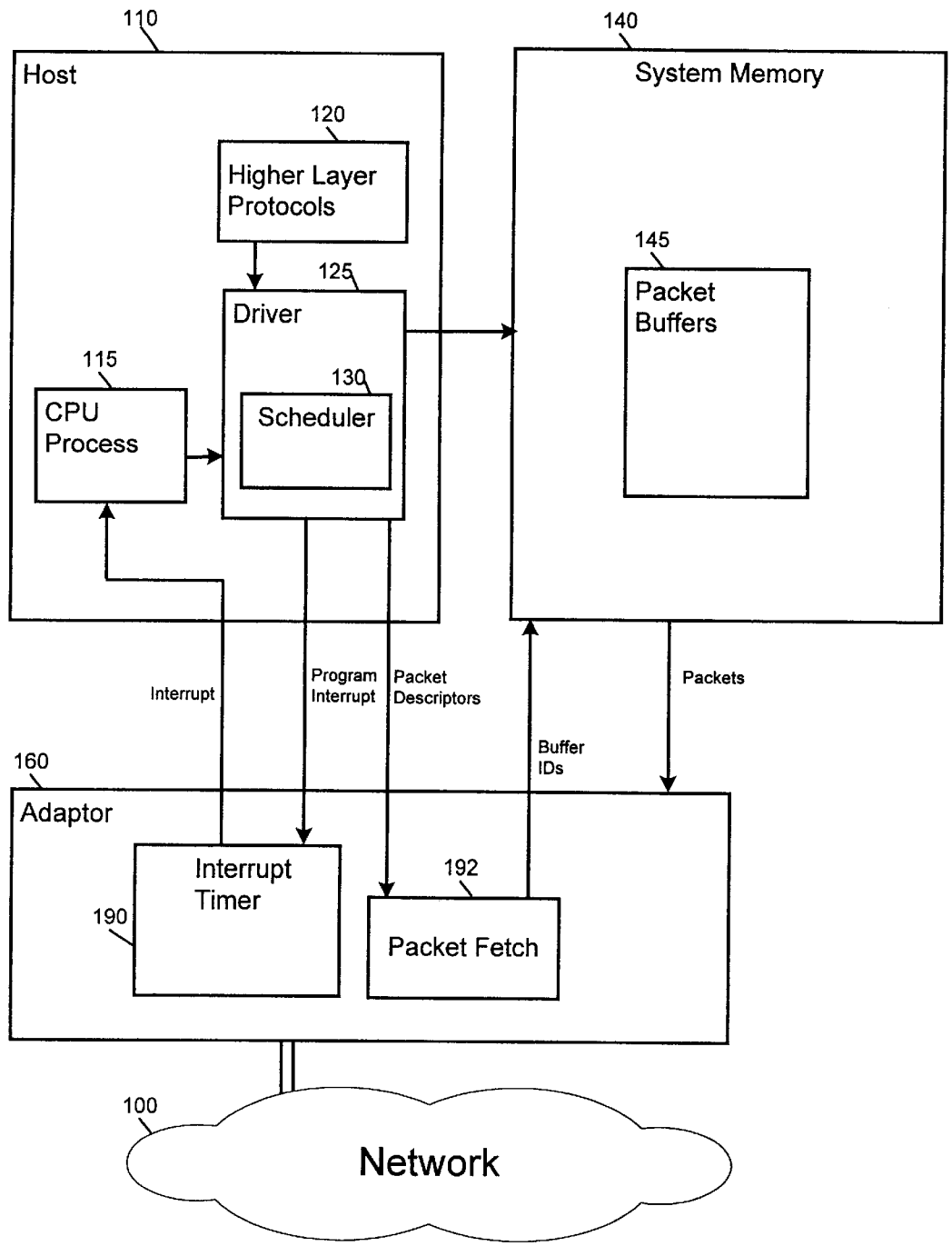
FIG. 3B is a block diagram of an end system having system memory and an adaptor using interrupt based download control according to one embodiment of the invention.

FIGS. 3A and 3B are each diagrams of an ES such as 500b with an adaptor according to alternative embodiments of the invention. FIGS. 3A and 3B both show a host 110 having a CPU process 115, system memory 140, and adaptor 160. Within host 110's processor and address space are higher layer network protocols 120, communicating with adaptor 160 through driver 125. Driver 125 operates in conjunction with a scheduler 130. According to the invention, scheduler 130 determines a schedule for packets to be transmitted based on a target bandwidth for a destination or group of destinations.

Where FIGS. 3A and 3B differ is the manner in which scheduler 130 sets alerts to control packet transmission in order to schedule packets to meet the target transmission bandwidth, as discussed in the section below.

Scheduler 130 determines a time that the next packet for a given destination should be queued on the adaptor for transmission by computing a current time (i.e. the download start time for the present packet to that destination) plus the time it will take to transmit the present packet on the network at the target bandwidth rate known to the scheduler, and then possibly adjusted by values that represent the local transmitter connection transmit time or possibly other local or network intermediate system delay times.

As described below, the invention may include a factor that causes packets to be transmitted from the transmitter slightly sooner than the scheduled time for the next packet, relying on elasticity (i.e. buffering capacity) in network intermediate systems to not deliver packets to the ultimate destination before the destination can receive them.

The target destination bandwidth rate may be set according to the actual bandwidth that can be handled by the destination, or may be set for other reasons, such as the control of different types of traffic or the carrying of traffic based on charges levied for access of the network. While the invention is designed for use in networks with variable-width or with fixed-width packets, the invention has particular application when large amounts of data are being transmitted to a destination, and in this case, packets will often be of a maximum (and therefore fixed) size. Therefore, packets of the same size are assumed in some of the following examples.

The operation of a scheduler such as 130 according to the invention will now be explained with reference to the example connections shown in FIGS. 2A–B. For purposes of this discussion, assume that T is a 100 Mbps device on a 100 Mbps link transmitting packets to destinations B and C, each having a target bandwidth of 10 Mbps, and to destination A having a target bandwidth of 30 Mbps. It will be obvious that many other target destinations are possible. If each packet takes 120 microseconds ($\mu s$) to transmit over the network at 100 Mbps, and therefore 1200 microseconds at 10 Mbps, according to the invention, if a packet is scheduled for destination B at time 0, the next packet for destination B should be queued by scheduler 130 for download at 0+1200 or 1200 $\mu s$. In a different embodiment, the transmit time may be adjusted by a value to take into account various latencies that may be associated with the network or to take advantage of network elasticity. For example, a value such as 120 $\mu s$ might be subtracted from the queue time for the next packet (perhaps representing the local transmitter time from T to the network) in which case the transmit time for the next packet would be 0 +1200−120, or 1080, microseconds. This would cause the transmitter to slightly "lead" the target bandwidth, but with the assumption that the extra bandwidth can be absorbed by buffering capacity in network intermediate and end system adaptors.

Further, the above formula assumes that the adaptor can transmit a packet as soon as it downloads the first byte from host memory, as described in coassigned U.S. Pat. No. 5,412,782. If the adaptor does not have that capability, the scheduling is adjusted by adding the delay time it takes to download the packet from the host to the adaptor to the 120 value subtracted from the packet transmit time.

The third packet for destination B is scheduled for download at 1200+1200 or 2400 microseconds. The fourth is scheduled for 1200+1200+1200 or 3600 microseconds. In each of these cases, the schedule could also be adjusted either to cause leading in the network or to take into account latency as described above. A packet schedule is similarly determined for other destinations for which the scheduler has received packets.

Temporal Sets Simplify Controlling Transmission of Packets

According to a further embodiment of the invention, a scheduler can schedule a number of packets to one, or to a variety of destinations, together in a temporal set. A temporal set is composed of a set of packets which can be transmitted in a back-to-back fashion by the adaptor on its network link without violating the maximum target bandwidth of any destinations.

Temporal sets are defined by scheduler 130 according to a number of alternative methodologies, depending on the requirements of the particular application.

In one embodiment, for each destination, or group of linked destinations, scheduler 130 determines a desired transmit time for each packet as described above for destination B such that packets to that destination will be transmitted near the target bandwidth of that destination. Scheduler 130 then places as many packets as possible in a temporal set, essentially filling up the set with packets so long as there is a packet available for some destination that could be transmitted immediately after the previous packet (i.e. transmitted back-to-back) without violating the bandwidth of any destination. When there are not more packets ready to be queued that meet that rule, scheduler 130 closes the temporal set and develops an alert for a future time determined by the next packet that needs to be delivered to a destination. Scheduler 130 places packets into their appropriate temporal sets and adjust sets as described below.

Placing a new packet in a temporal set

A temporal set is characterized by a temporal set download start time (Set_TxQueue_Time) and an estimated set transmission end time (Set_Tx_End) for packets currently in the temporal set. According to one embodiment of the invention, a packet is placed in a temporal set by scheduler 130 when that packet's desired download start time (Packet_TxQueue_Time) is greater than or equal to Set_TxQueue_Time and is less than or equal to Set_Tx_End plus the packet transmission time (Packet_Tx_Time). Furthermore, according to one embodiment, the set's start time (Set_TxQueue_Time) and Set_Tx_End are adjusted by a value determined by the start time and transmission time of the packet. One embodiment is represented by the code below:

```
If Packet_TxQueue_Time + Packet_Tx_Time < Set_Tx_End
    Set_TxQueue_Time = Set_TxQueue_Time − Packet_Tx_Time
Else
    Diff_Time = Packet_TxQueue_Time + Packet_Tx_Time −
    Set_Tx_End
    Set_Tx_End = Packet_TxQueue_Time + Packet_Tx_Time
    Set_TxQueue_Time = Set_TxQueue_Time − Diff_Time
End
```

Figure 4A:
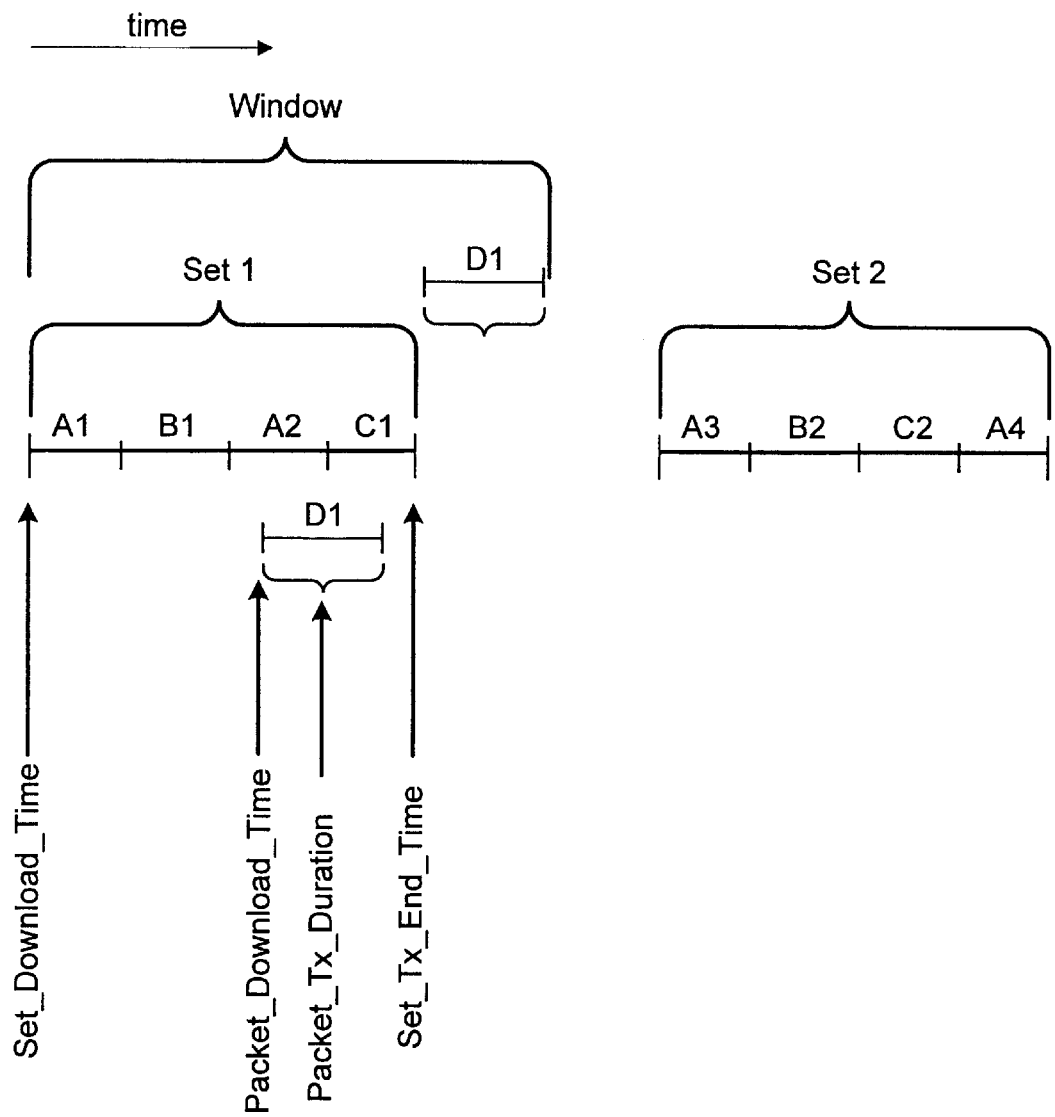

FIG. 4 illustrates the mechanism described above for scheduling a new packet received by scheduler 130 once a number of temporal sets have been defined for packets to be transmitted, according to one embodiment of the invention. In FIG. 4, assume that a packet D1 is presented to scheduler 130 after sets 1 and 2 have been defined as shown. According to one embodiment, D1 is placed in temporal set 1 if D1's Packet_TxQueue_Time (or Packet_Download_Time) is greater than or equal to Set 1's Set_TxQueue_Time (or Set_Download_Time) and less than or equal to the Set_Tx_End_Time plus D1's Packet_Tx_Duration. In other words, D1 is added to the set if its scheduled Packet_Download_Time falls within the window as shown in FIG. 4.

According to a further specific embodiment, a temporal set's Set_Download_Time may be adjusted when a new packet needs to be added to a temporal set. This may result in some packets in the temporal set being transmitted slightly ahead of their desired scheduled time, but this in general is not a problem in real networks because the intermediate devices such as 67 in the networks provide some elasticity (or intermediate buffering capacity) allowing them to accept a packet on one port even if they are not yet ready to transmit it out of another port. The following code provides one example of adding D1 to the end of a set taking advantage of this elasticity, with the cases as illustrated in FIG. 4:

```
Case A:   If Packet_Download_Time + Packet_Tx_Duration < Set_Tx_End_Time
              Set_Download_Time = Set_Download_Time - Packet_Tx_Duration
Case B:   Else
              Overlap_Time = Set_Tx_End_Time - Packet_Download_Time
              Set_Tx_End_Time = Packet_Download_Time + Packet_Tx_Duration
              Set_Download_Time = Set_Download_Time - Overlap_Time
          Endif
```

It will be seen that in Case A, the new packet fits entirely within existing Set_Tx_Time and scheduler 130, according to the invention, adjusts the set's download time earlier and adds the new packet to the Case B, a new p In Case B, a new packet overlays the end of existing Set_Tx_Time, but still meets criteria for being added to the set. Scheduler 130 in this case will adjust the set's download time earlier by the amount of non-overlap, and add the new packet to end.

It will be apparent to those of skill in the art that other formulas for adjusting the set's start time are possible and may be adjusted depending on the characteristics of the particular network.

As a further example, assume destinations A, B, and C, all connected via a network to a server/transmitter T, as shown in FIG. 2. A is connected directly to a 100 megabit network, but can only receive packets at 30 mbps. B and C are 10 megabit systems connected via a buffering switch to the same 100 megabit network. Assume the jitter estimate is 50 microseconds. Assume the following packets are submitted for transmission to a scheduler according to the invention at transmitter T with packets A1 being the first packet submitted with a destination A, packet A2 being the second packet for A, etc: A1, A2, A3, A4, B1, B2, B3, C1, C2, C3. For simplicity, assume each packet takes 120 microseconds to transmit at 100 Mbps, 400 microseconds at 30 Mbps, and 1200 microseconds at 10 Mbps. With all of this information known to scheduler 130 at transmitter T, scheduler 130 would take the actions shown in Table 1.

Scheduler 130 would first determine a desired transmission schedule for the three destinations as follows:

A1=0, A2=400, A3=800, A4=1200;

B1=0, B2=1200, B3=2400;

C1=0, C2=1200, C3=2400.

TABLE 1

|  | Real-time Count | Packet Download Time | Assumed Local Tx complete |  |
|---|---|---|---|---|
| Programmed Alert Temporal Set 1 | −50 µs | NA | NA | (Alert latency is 50 µs) |
| Alert | 0 | NA | NA | (Alert latency is 50 µs) |
| Queue A1 | 0 | 0 | 120 µs |  |
| Queue B1 | 0 | 0 | 240 µs |  |
| Queue A2 | 0 | 400 | 360 µs |  |
| Queue C1 | 0 | 0 | 480 µs |  |
| Program Alert for time 630 µs Temporal Set 2 | 0 |  |  | (680 = 800 − 120 − 50) |
| Alert | 630 µs | NA | NA | (Alert latency is 50 µs) |
| Queue A3 | 680 µs | 800 | 800 µs |  |
| Queue B2 | 680 µs | 1200 | 920 µs | (800 >= 1200 − 360 − 50) |
| Queue C2 | 680 µs | 1200 | 1040 µs |  |

TABLE 1-continued

|  | Real-time Count | Packet Download Time | Assumed Local Tx complete |  |
|---|---|---|---|---|
| Queue A4 | 680 µs | 1200 | 1160 µs |  |
| Program Alert for 2110 µs Temporal Set 3 | 680 µs | NA | NA | (2230 = 2400 − 120 − 50) |
| Alert | 2230 µs | NA | NA | (Alert latency is 50 µs) |
| Queue B3 | 2280 µs | 2400 | 2280 µs |  |
| Queue C3 | 2280 µs | 2400 | 2400 µs |  |

Note that in this particular embodiment the scheduler does not take into account the actual download time or transmission time of a packet for a given destination when scheduling subsequent packets for that destination. Though packet C1, for example, is not completely locally transmitted into the network until time 480 µs, scheduler 130, in this embodiment, schedules packet C2 as though it should ideally be transmitted at 1200 µs. In this embodiment, scheduler 130 is primarily concerned with controlling bandwidth to a transmitter, and assumes that once the schedule for a given destination is set to control the bandwidth to that destination, elasticity within the network can handle the leading of some packets. This assumption both simplifies the design of scheduler 130 and leads to improved network throughput. Other embodiments of the invention of more complex design are possible where scheduler 130 accounts for the delays caused to one destination by congestion from another destination in the scheduling of packets. However, in many situations the embodiment just described will provide superior network throughput and will be more simple to implement.

In a further embodiment, an adaptor driver residing in a host may perform set gluing, whereby when a set's start time or end time are adjusted so that it overlaps with an adjacent set, temporal sets are combined so that the host receives just one alert to initiate transmission of the packets.

Mechanisms for alerting the host to send scheduled packets

Once the scheduler 130 has determined a schedule for packets in order to control transmission bandwidth, according to further alternative embodiments of the invention, scheduler 130 employs various mechanisms to set some future time at which the adaptor will be instructed to transmit a packet or a group of packets. The time-based downloading just described may be used with either of the below described alert mechanisms or with other alert mechanisms.

Descriptor Based Alerts Scheduling

FIG. 3A illustrates a scheduler in an adaptor employing descriptor based scheduling. FIG. 3B illustrates an alternative embodiment of a scheduler in an adaptor employing programmed interrupt alerts to schedule packets and will be described in more detail below. According to this embodiment, scheduler 130 uses bits placed in packet descriptors to specify a time at which packet download will begin, in either absolute or relative terms. An adaptor according to the invention examines the scheduling indication in a packet descriptor and uses that indication to determine when packets should be downloaded from system memory and transmitted on the network. According to this aspect of the invention, each packet descriptor may carry a scheduling indication, or packets may be grouped in temporal sets, with the indication for the first packet in the group being the alert to the adaptor to then transmit the set.

In one embodiment, adaptor 160 reads schedule time 144a from the data structure 142a and compares that to a real-time counter 162. If real-time counter 162 has a lower value than the schedule time, the adaptor waits and does not transmit the packet on the network. If the real-time counter has a higher value than the schedule time, the adaptor down-loads the packet for transmission. In one embodiment, a packet is stored in one or more packet data buffers 146a–c in system memory 140.

FIG. 5 illustrates one example of a packet descriptor data structure 142 (stored in system memory) including schedule indications according to a specific hardware embodiment of the invention. In some embodiments, this descriptor will be stored in a different place than the packet data, and the descriptor will be separately passed to the adaptor before the adaptor downloads the data from system memory for transmission. The labels in the figure indicate the following:

DnNextPtr points to the next data structure of this kind, allowing a chained list of packet data structures, which can be used for indicating the next packet in a temporal set;

ScheduleTime contains information fields controlling when this packet is to be downloaded;

FrameStartHeader contains control information for the packet;

Each DnFragAddr/DnFragLen pair describes a data buffer in system memory (such as 146a and 146b). The buffers are downloaded (moved from system memory to the adaptor) one by one; together the buffers comprise the packet to be transmitted.

FIG. 6 defines the format of ScheduleTime as stored with a packet descriptor in system memory according to one embodiment of the invention. In this embodiment, an initial value is loaded into counter 162 when a scheduler first begins scheduling a stream of packets. This value initiates the RealTimeCnt and in many cases can be thought of as zero. The labels in the figure indicate the following:

loadTimeCnt [bit 28]: This bit, when set, instructs the adaptor to load the value in the scheduleTime field into the RealTimeCnt register, and download the packet immediately. When loadTimeCnt is set, scheduleTimeValid is ignored by the adaptor.

scheduleTime [bits 23:0]: Provides either a count value time at which to download this packet, or a value to be loaded into RealTimecnt to initiate counter 162, or is ignored, depending upon the values of load TimeCnt and scheduleTimeValid.

When scheduleTimeValid is set, scheduleTime represents the time at which the packet is to be downloaded. When the adaptor sees scheduleTimeValid set, circuits therein compare scheduleTime against the value in the RealTimeCnt counter register. If RealTimeCnt is less, then the adaptor goes into a polling mode, in which it periodically re-fetches the ScheduleTime word and compares it against RealTimeCnt. The poll rate is determined by the value in DnPoll. ScheduleTime specifies a time in increments of 800 ns.

scheduleTimeValid [bit 29]: When set, indicates that scheduleTime contains a value that is to be compared to the RealTimeCnt. When not set, indicates that the packet is to be transmitted under control of a preceding packets scheduleTime, i.e. it indicates that the packet is part of a temporal set whose start time is located in an earlier packet's descriptor.

Figure 7:
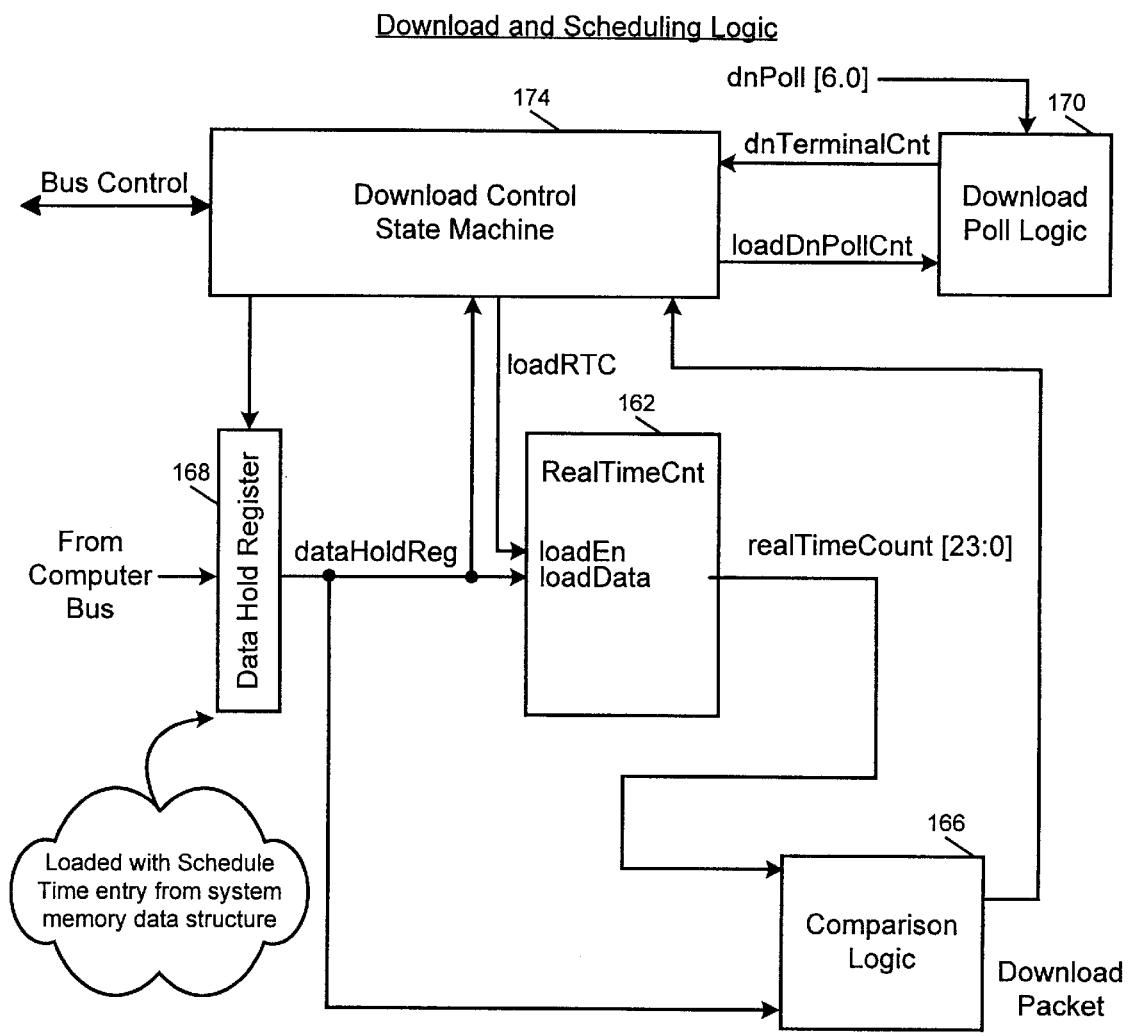
FIG. 7 is a block diagram of the download and scheduling logic used in the adaptor shown in FIG. 3C.
Figure 8:
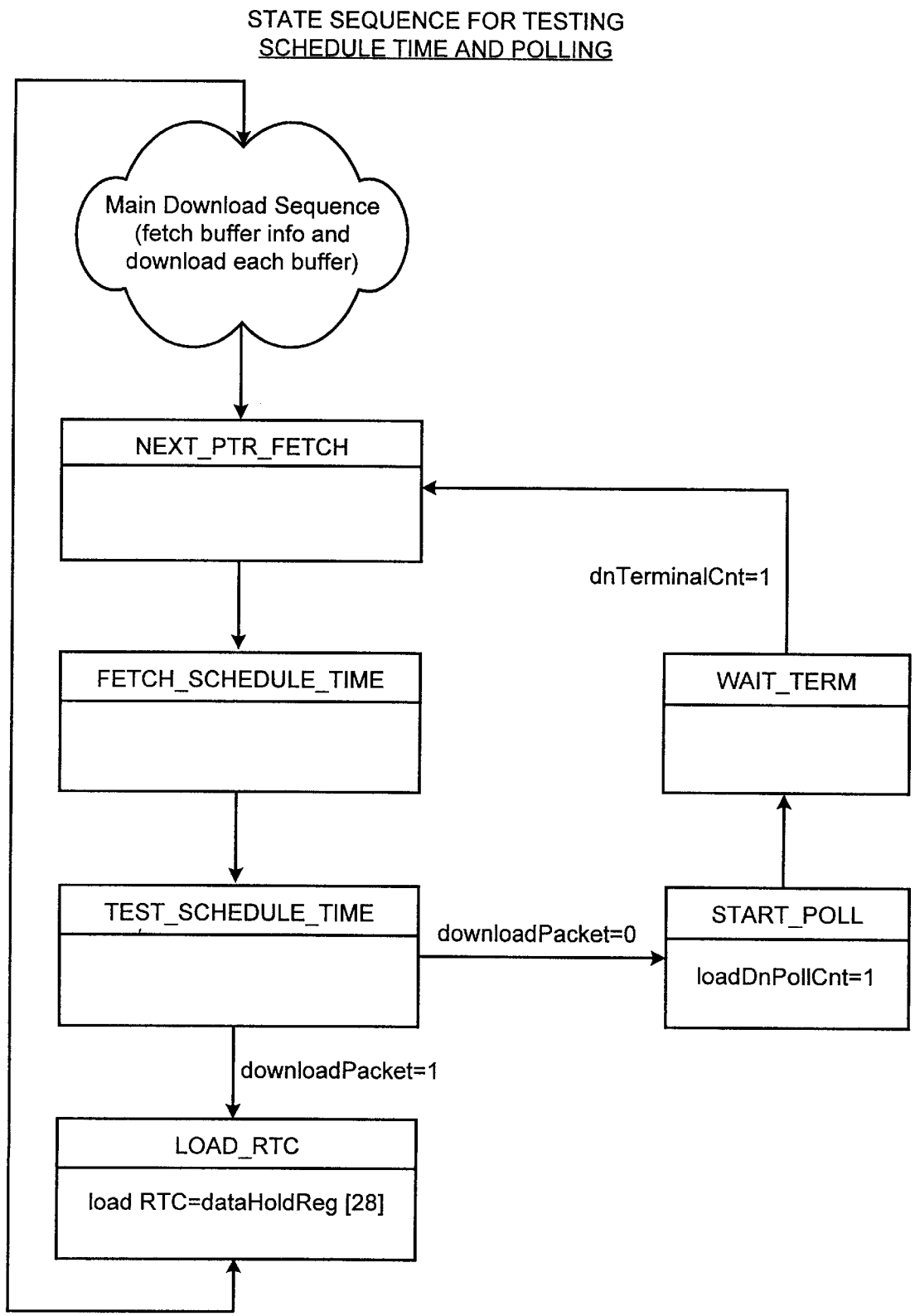
FIG. 8 illustrates the state sequence for the schedule time polling of the circuit illustrated in FIG. 6.

FIG. 7 is a block diagram of the operation of download and scheduling logic 161 and FIG. 8 illustrates the state sequence for testing schedule time and for polling. As shown in FIG. 7, a packet is downloaded from system memory to the adaptor when one of these three conditions is true, as determined by comparison logic 166 and conveyed to state machine 174 via the download packet signal: (1) the packet data structure contains an initial value to be loaded into RealTimeCnt (loadTimeCnt =1); (2) the packet data structure, as placed in DataHoldRegister 168, contains a ScheduleTime entry, and RealTimeCnt 22 ScheduleTime. (If RealTimeCnt < ScheduleTime, the adaptor waits a time period specified by dnPoll [6:0] and refetches ScheduleTime.); or (3) both LoadTimeCnt and scheduleTime Valid in the packet data structure are zero (indicating there is no meaningful data in scheduleTime, and that the packet is part of a temporal set whose start time is determined by an earlier packet in the set.

Figure 9:
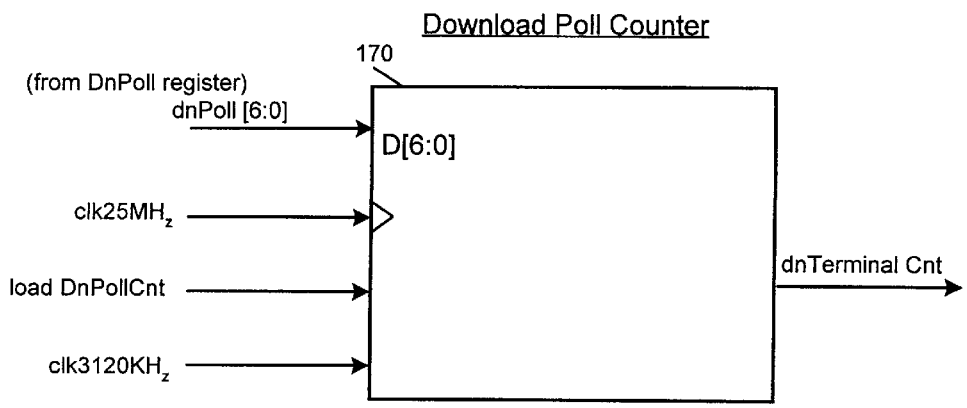
FIG. 9 illustrates the dnPollCnt counter according to a specific embodiment of the invention.

FIG. 9 shows the manner in which the dnPollCnt counts down once every pulse of a 3120 Khz clock from the value loaded from DnPoll register.

FIG. 10 shows real time count register 162 according to one embodiment of the invention. RealTimecnt is a real-time counter which supports the packet download scheduling function. RealTimeCnt counts continuously, incrementing every 800 ns (0.8 $\mu$s), and wrapping to zero when it reaches its maximum value. When a transmit packet is scheduled for download, the download starts when RealTimeCnt is greater than or equal to the value in the packet data structure's scheduleTime field. RealTimeCnt is loaded with the value in scheduleTime when the loadTimeCnt bit is set. This has the side effect of causing the packet to be downloaded immediately. RealTimeCnt is cleared by reset.

FIG. 11 shows the register format wherein the value in DnPoll determines the rate at which the current packet data structure is polled. Packet data structures are polled for two different reasons: (1) When a zero DnNextPtr is fetched from the current packet data structure, DnNextPtr is polled to determine when a new packet data structure is ready to be processed; (2) When packet download is delayed with ScheduleTime, the packet data structure is polled to determine when the RealTimeCnt has reached the required ScheduleTime. Polling is disabled when DnPoll is cleared. DnPoll is cleared by reset. The value in DnPoll represents 320 ns time intervals. The maximum value represents 40.64 μs.

FIG. 3B illustrates an alternative embodiment of the invention including an interrupt's based alert mechanism. In this embodiment, scheduler 130 programs an interrupt in interrupt timer 190. When the time for the interrupt arises, interrupt 190 generates an interrupt which is received by CPU process 115. CPU 115 then alerts driver 125 that an interrupt has occurred. Driver 125 may then initiate packet fetch through packet controller 192 for the next packet or group of packets and scheduler 130 may then set a next interrupt. Note that interrupts may be generated on a packet by packet basis, or interrupts may be taken for temporal sets of packets which are then transmitted back-to-back on the network.

The invention has now been explained with reference to specific and alternative embodiments. Other embodiments will be obvious to those of skill in the art. The invention therefore should not be limited except as provided for in the attached claims as extended by allowable equivalents.

What is claimed is:

1. A method for scheduling packets to be downloaded from a host to an adaptor in order to control packet transmission rate comprising:

creating a temporal set of packets that can be transmitted in a back-to-back fashion without violating a maximum bandwidth requirement of said packets' target destination addresses;

characterizing said temporal set by a download start time and an estimated transmission end time;

grouping a packet into a temporal set based on a grouping rule for said packet; and adjusting said temporal set's download start time and estimated transmission end time according to said grouping rule.

2. The method according to claim 1 wherein said grouping rule involves grouping a packet into a temporal set when the packet's download start time is greater than or equal to the set download start time and less than or equal to the set transmission end time plus the packet transmission time.

3. The method according to claim 1 wherein said grouping rule involves adjusting the set download start time by an amount determined by an overlap between the desired packet download time of said new packet and said set download start and end times.

4. The method according to claim 3 wherein said grouping rule involves adjusting the set transmission end time by an amount determined by the time necessary to transmit the new packet.

5. The method according to claim 2 wherein scheduling may be represented by the formula:

If Packet TxQueue Time + Packet Tx Time < Set Tx End
    Set TxQueue Time = Set TxQueue Time − Packet Tx Time,
    Else  Diff Time = Packet TxQueue Time + Packet Tx Time − Set Tx End
        Set Tx End = Packet TxQueue Time + Packet Tx Time
        Set TxQueue Time = Set TxQueue Time − Diff Time.

6. The method according to claim 1 further comprising computing a download delay until a next temporal set.

7. The method according to claim 6 further comprising generating a programmed interrupt at the time for the next set.

8. The method according to claim 4 further comprising set gluing, whereby temporal set are combined when the start time of one temporal set approaches the end time of another temporal set.

9. The method according to claim 6 further comprising including bits in packet descriptors in system memory specifying the time at which packet download will begin in either absolute or relative terms.

10. A network transmitter capable of controlling its rate of transmission to meet a target bandwidth comprising:

a destination bandwidth identifier for determining a target bandwidth for a particular destination or group of destinations;

a scheduler for determining when a next packet for a particular destination should be queued for transmit in order to meet said target bandwidth and for programming an alert;

a programmable alert controller for causing transmission of said next packet; and an interface for receiving packets to be transmitted.

11. The device according to claim 10 further comprising:

a set builder for grouping scheduled packets into sets in order to allow said alert controller to cause an alert for a set of packets, said set of packets transmitted in back-to-back fashion.

12. The device according to claim 10 wherein said alert controller comprises an interrupt controller for programming a future interrupt to initiate the future transmission of a packet.

13. The device according to claim 10 wherein said alert controller comprises a packet descriptor scheduler for placing schedule time indications in packet descriptors to indicate download times for a packet.

14. The device according to claim 10 wherein said network transmitter comprises an adaptor driver.

* * * * *